United States Patent [19]

Spies et al.

[11] Patent Number: 5,804,510
[45] Date of Patent: Sep. 8, 1998

[54] FABRIC ADHESIVE TAPE

[75] Inventors: Manfred Spies, Biedenkopf; Heiko Leydecker, Neustadt/Holstein; Klaus Külper, Pinneberg, all of Germany

[73] Assignee: Beiersdorf Aktiengesellschaft, Hamburg, Germany

[21] Appl. No.: 753,166

[22] Filed: Nov. 21, 1996

Related U.S. Application Data

[63] Continuation of Ser. No. 443,523, May 18, 1995, abandoned.

[30] Foreign Application Priority Data

Jun. 1, 1994 [DE] Germany ............... 44 19 169.3

[51] Int. Cl.⁶ ..................................... C09J 7/02
[52] U.S. Cl. ............ 442/141; 442/142; 442/151; 428/343; 428/355 AC; 428/921

[58] Field of Search ................... 428/921, 354, 428/355, 261, 355 AC; 442/141, 142, 151

[56] References Cited

U.S. PATENT DOCUMENTS

| | | | |
|---|---|---|---|
| 3,658,579 | 4/1972 | Ottinger | 428/921 |
| 3,926,990 | 12/1975 | Fukuba | 260/249.6 |
| 4,284,542 | 8/1981 | Boyce | 260/27 R |
| 5,229,192 | 7/1993 | Kober | 428/209 |

*Primary Examiner*—Jenna Davis
*Attorney, Agent, or Firm*—Sprung Kramer Schaefer & Briscoe

[57] ABSTRACT

Fabric adhesive tape for wrapping cable harnesses, having a) a permeable fabric base containing a halogen- and antimony-free flameproofing agent and
b) a polar self-adhesive composition containing a halogen- and antimony-free flameproofing agent.

11 Claims, No Drawings

FABRIC ADHESIVE TAPE

This application is a continuation, of application Ser. No. 08/443,523, filed May 18, 1995 now abandoned.

The invention relates to a fabric adhesive tape for wrapping cable harnesses, in particular a halogen-free, flame-retardant fabric adhesive tape having oil-, diesel- and gasoline-resistant properties. The invention thus relates to the development of a halogen-free, flame-retardant fabric adhesive tape comprising a flameproofed base fabric and an adhesive composition based on acrylates or rubbers to which inorganic phosphates have been admixed as flameproofing agents, and which furthermore exhibits good resistance to usual under-bonnet liquids.

In the automotive and aircraft industries, individual parallel electrical cables are combined at certain points to form so-called cable harnesses. These cable harnesses are generally wrapped with fabric adhesive tapes.

Since these cable harnesses frequently come into contact with nonpolar liquids, such as oil or diesel fuel, in the engine compartment, which can cause the wrapping to come apart, there is a general desire for adhesive tapes whose adhesive compositions are resistant to said liquids. Furthermore, a partially dissolved adhesive which has diffused through the base material results in areas in which dirt particles accumulate to an increased extent.

Adhesive tapes comprising an impermeable fabric are frequently excluded from such applications for cost reasons. In recent years, safety considerations have meant that the requirement for oil and fuel resistance has been joined by the further requirement of flame retardancy. If a cable fire occurs in the engine compartment, for example as a consequence of an electrical short-circuit, the flames can advance more easily through combustible wrapping materials and thus endanger the passenger compartment. This is even easier if oil or fuel residues mixed with dirt particles accumulate on the able harness, promoted by a partially dissolved adhesive composition which has diffused through the base material.

Halogen- and antimony-containing flameproofing agents for polymers are known and described in the relevant literature (cf., for example, H. Batzer, Polymere Werkstoffe, [Polymeric Materials], Vol. II, p. 354 (1984) or Gachter/Muller, Kunststoff-Additive [Plastics Additives], p. 737 (1989)). The more recent patent literature likewise contains some publications in which such systems are employed for flame-retardant self-adhesive tapes, for example DE 4209210 A1. Halogen- and antimony-containing additives are used therein, but these are unacceptable in self-adhesive compositions owing to their toxicity. Flame-retardant halogen- and antimony-free fabric adhesive tapes for cable-wrapping which are furthermore insensitive to the nonpolar liquids customary in the engine compartment are totally unknown.

The object of this invention was to develop a corresponding adhesive tape in order to fill the existing gap. Accordingly, the invention relates to a fabric adhesive tape for wrapping cable harnesses, as characterized in greater detail in the patent claims.

The permeable fabric base and the polar self-adhesive composition interact in a particular manner here. Firstly, the fabric base is appropriately flame-proofed, but at the same time, the polar self-adhesive composition, with its own appropriate flameproofing, helps in the same aim, and finally the polarity of the self-adhesive composition provides it with resistance to nonpolar solvents, which is additionally favourable for engine compartments and the like, since it prevents a tape partially dissolved by, for example, oil or diesel oil from being damaged even completely loosened, the tape being particularly susceptible in this state in the event of a fire, in particular with respect to partially dissolved adhesive composition constituents which have diffused through the base material, which can accumulate dirt particles and oil residues.

The novel fabric adhesive tape is thus particularly suitable for wrapping cable harnesses and is distinguished by good resistance to the liquids conventional in the engine compartment, for example oil, diesel fuel or gasoline. The preferred materials are described in greater detail below.

Base materials

The base materials for cable-wrapping self-adhesive tapes are frequently fabric bases, which offer various advantages over films. Fabric bases only impair the original cable harness flexibility very slightly, rattling noises can be prevented, and higher temperatures are furthermore possible.

The purpose of the invention is served by polyester fabrics, viscose staple fabrics or cotton fabrics. Polyester fabrics are distinguished by good abrasion resistances, a property which makes these bases particularly suitable for the purposes according to the invention since a worn tape is disadvantageous both with respect to strength and flame retardancy. The physical data of the fabric are variable within broad limits. For wrapping applications, base thicknesses in a range of from 100 to 500 $\mu$m are preferred, and suitable thread counts are from about 20 threads/cm warp and 20 threads/cm weft.

The fabric base is flameproofed without halogen and antimony and can be flameproofed, in particular, with a solution of an inorganic phosphate or hydroxide, preferably ammonium polyphosphate. The ammonium polyphosphate content should be in the range of from 10 to 100 g/m$^2$, preferably 30 g/m$^2$. If the flameproofing agent content is too high, the fabric loses its flexibility which is necessary for the application.

Adhesive compositions

The adhesive compositions can be, in particular, polyacrylate and modified rubber systems to which a flameproofing agent according to the invention has been added. The polar nature of the skeletal polymers gives he adhesive compositions resistance to the liquids occurring in the engine compartment, such as oil or diesel fuel.

Particularly suitable polyacrylates are copolymers based on acrylates having short carbon side chains of up to 8 carbon atoms and acrylic acid. Either solvent systems or dispersions can be employed, dispersions having the advantage of being free from residual solvent. Mixing the polyacrylate dispersions with appropriate (water-based) tacifiers allows the adhesive properties to be varied. Carboxyl-containing acrylate copolymers are commercially available.

Particularly suitable modified rubbers are skeletal polymers based on nitrile rubber or epoxidized rubber. Both variants have considerably greater polarity than natural rubber, so that solubility in nonpolar solvents is much lower. In the case of rubber systems, additives which are conventional in adhesive compositions, in particular tacifiers, anti-ageing agents and fillers, are advantageously added to the skeletal polymers.

Halogen- and antimony-free flameproofing agents, in particular inorganic phosphates or hydroxides, preferably ammonium polyphosphate, are then added to the polyacrylate and rubber adhesives, giving flame-retardant or self-extinguishing systems. The flameproofing agent concentration should be in the range of from 5 to 40%, preferably in the range of from 7.5 to 15%, based on the solids content. In order to achieve an optimum. flameproofing effect, the flameproofing agent must be homogeneously distributed in the adhesive composition.

The adhesive compositions may furthermore be chemically crosslinked by means of conventional cross-linking agents, for example aluminium chelate, titanium chelate or adipic dihydrazide; physical crosslinking (ESH) is likewise possible.

Coating

If technical reasons exist for using an adhesive composition of only low polarity, the base fabric can be coated on the reverse, in particular with a non-adhesive, carboxyl-containing acrylate copolymer, to which flameproofing agents in the above concentration can again be admixed. The dissolution capacity of the nonpolar adhesive composition is thus reduced after application as a cable wrapping tape. Nevertheless, the fabric base remains permeable in spite of this coating. And this coating at the same time prevents attack on the self-adhesive composition by solvents, and the solvent sensitivity is greatly improved even in the case of lower-polarity adhesive compositions.

The invention is described below with reference to working examples, but is not unjustifiably restricted thereto.

EXAMPLE 1

15.272 kg of Primal PS 83 D (Rohm und Haas) are carefully mixed with 1 kg of Snowtack SE 380 A (Eka Nobel) in a 50 litre plastic vessel. 1 kg of ammonium polyphosphate is subsequently added, and the mixture is stirred for about 30 minutes. In order to increase the viscosity of the system as a whole, it is thickened with 0.333 kg of Collacral HP (BASF).

Careful homogenization should be ensured during all additions.

The resultant adhesive composition is coated continuously over the entire area of a release paper or. release film in a coating thickness of about 80 g/m$^2$ and, after drying, transfer-laminated onto a polyester fabric treated with ammonium polyphosphate and having a thread count of 20 threads/cm warp and 22 threads/cm weft, a thickness of 300 μm and a tear strength of >150N/cm.

| Technical conditions: | |
|---|---|
| Machine: | Curtain coating unit |
| Applicator: | Spreader bar |
| Base web speed: | 50 m/min. |

The coated fabric is subsequently dried thermally.

| Drying temperatures: | Prechannel | 60° C. | | |
|---|---|---|---|---|
| | Zone 1 | 70° C., | Zone 2 | 80° C. |
| | Zone 3 | 90° C., | Zone 4 | 100° C. |
| | Zone 5 | 100° C., | Zone 6 | 120° C. |
| | Zone 7 | 120° C., | Zone 8 | 120° C. |
| | Zone 9 | 120° C. | | |

The resultant product proves to be non-combust- ible in the US FMVSS 302 standard test method and gives excellent results in cable wrapping.

EXAMPLE 2

19.090 kg of a free-radical-polymerized bead polymer (solids content 44%), comprising 75% of butyl acrylate, 15% of 2-ethylhexyl acrylate and 5% of acrylic acid (based on the solids content) are carefully mixed with 1 kg of Snowtack SE 380 A (EKA Nobel) in a 50 litre plastic vessel. 1 kg of ammonium polyphosphate is subsequently added, and the mixture is stirred vigorously for about 30 minutes in order to achieve a homogeneous distribution of the flameproofing agent. The viscosity of the system as a whole is increased by means of 0.333 kg of Collacral HP (BASF). The resultant adhesive composition is applied continuously over the entire area in a coating thickness of about 60 g/m$^2$ to a polyester fabric as in Example 1 containing ammonium polyphosphate.

| Technical conditions: | |
|---|---|
| Machine: | Curtain coating unit |
| Applicator: | Spreader bar |
| Base web speed: | 50 m/min. |

The coated fabric is subsequently dried thermally.

| Drying temperatures: | Prechannel | 60° C. | | |
|---|---|---|---|---|
| | Zone 1 | 70° C., | Zone 2 | 80° C. |
| | Zone 3 | 90° C., | Zone 4 | 100° C. |
| | Zone 5 | 110° C., | Zone 6 | 120° C. |
| | Zone 7 | 130° C., | Zone 8 | 130° C. |
| | Zone 9 | 130° C. | | |

The resultant product proves to be non-combust- ible in the US FMVSS 302 standard test method and is suitable like the product from Example 1.

We claim:

1. A halogen-free, flame retardant fabric-based self-adhesive tape comprising:
    a) a permeable fabric base comprising a halogen- and antimony-free flameproofing agent; and
    b) a polar self-adhesive composition thereon comprising a halogen- and antimony-free flameproof agent, said self-adhesive composition comprising acrylate or modified rubber and exhibiting low solubility in nonpolar liquids,
said permeable fabric base being treated with said flameproofing agent apart from the flameproofing agent contained in said self-adhesive composition.

2. Fabric adhesive tape according to claim 1, the fabric base has been impregnated with inorganic phosphates or hydroxides.

3. Fabric adhesive tape according to claim 1, the fabric base is a viscose staple or cotton fabric or, polyester fabric.

4. Fabric adhesive tape according to claim 1, the self-adhesive composition contains inorganic phosphates or hydroxides.

5. Fabric adhesive tape according to claim 1, the fabric base is coated in the reverse with an acrylate.

6. A cable harness wrapped in a fabric adhesive tape according to claim 1.

7. Fabric adhesive tape according to claim 1, the fabric base has been impregnated with ammonium polyphosphate.

8. Fabric adhesive tape according to claim 1, the fabric base is a polyester fabric.

9. Fabric adhesive tape according to claim 1, the self-adhesive composition contains ammonium polyphosphate.

10. Fabric adhesive tape according to claim 1, the fabric base is coated on the reverse with a thermally crosslinkable, carboxyl-containing acrylate copolymer.

11. Fabric adhesive tape according to claim 1, wherein said permeable fabric base is impregnated with said halogen-and antimony-free flameproofing agent prior to treating with said flameproofing agent containing self-adhesive composition.

* * * * *